(12) United States Patent
Yasuda

(10) Patent No.: US 6,528,813 B2
(45) Date of Patent: Mar. 4, 2003

(54) RADIATION IMAGE READOUT APPARATUS

(75) Inventor: Hiroaki Yasuda, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 19 days.

(21) Appl. No.: 09/837,179

(22) Filed: Apr. 19, 2001

(65) Prior Publication Data

US 2001/0032945 A1 Oct. 25, 2001

(30) Foreign Application Priority Data

Apr. 20, 2000 (JP) ........................................ 2000-119320

(51) Int. Cl.$^7$ ................................................ G03B 42/08
(52) U.S. Cl. ..................... 250/588; 250/581; 250/584
(58) Field of Search ................................ 250/581, 584, 250/585, 586, 587, 588, 589, 590

(56) References Cited

U.S. PATENT DOCUMENTS 4,806,758 A * 2/1989 Yoshimura et al. ...... 250/327.2
4,952,806 A * 8/1990 Mori ...................... 250/327.2

* cited by examiner

Primary Examiner—Constantine Hannaher
Assistant Examiner—Timothy J. Moran
(74) Attorney, Agent, or Firm—Sughrue Mion, PLLC

(57) ABSTRACT

A radiation image readout apparatus which provides the option of selecting whether or not radiation energy is to be erased after readout thereof has been performed, which is provided with a readout portion for reading out the image data of a radiation image from a stimulable phosphor sheet, and an erasing means for erasing the radiation energy remaining on the stimulable phosphor sheet after readout therefrom has been performed. The apparatus also has a mode input switch for selecting and inputting the desired readout mode from among the three choices of readout-and-erase mode, readout only mode, and erase only mode, and a control means for controlling the readout means and the erasing means according to the mode that has been selected and input.

9 Claims, 4 Drawing Sheets

RADIATION IMAGE READOUT APPARATUS

BACKGROUND OF THE INVENTION

1. Field of the Invention

The present invention relates in general to a radiation image readout apparatus, and more particularly to a radiation image readout apparatus equipped with a readout portion, as well as an erasing portion for erasing the radiation energy remaining on a stimulable phosphor sheet after readout has been performed.

2. Description of the Related Art

In the field of radiology, there are in wide use today radiation image readout systems dependent upon radiation image readout apparatuses employing stimulable phosphor sheets, which contain stimulable phosphors that store a portion of radiation energy upon exposure thereto and emit stimulated emissions of a quantity corresponding to the radiation energy stored thereon upon exposure to visible or other stimulating light, to once record the image data of a radiation image obtained by storing a portion of the radiation passing through a subject, such as a human body, etc. on a stimulable phosphor sheet, wherein the stimulable phosphor sheet on which the radiation image has been recorded is scanned by a stimulating light such as a laser, and an image signal is obtained by photoelectrically reading out the stimulated emissions thereof.

According to the radiation image readout systems described above, after readout of the radiation image data, there remains on the stimulable phosphor sheet a quantity of radiation energy that was not completely dissipated during image readout. This energy (remaining radiation energy) originates in the radiation image data that had been stored on the stimulable phosphor sheet, and if it is of a level that cannot be ignored, the next time a radiation image is recorded on the stimulable phosphor sheet, the remaining radiation energy and the previous image are reproduced as noise. Because of this, it is necessary to erase this remaining radiation energy after image readout is performed.

To erase the remaining radiation energy, it can be caused to be emitted and dissipated; for example, a method can be used by which the stimulable phosphor sheet is exposed to ordinary light for a long period of time to dissipate the remaining radiation, or exposed to a high-intensity visible light for a short duration to accomplish the same. If erasable energy is applied to the stimulable phosphor sheet in this way, it is possible to reuse the stimulable phosphor sheet.

Generally, the radiation image readout apparatus employed in the radiation image readout system described above, aside from the readout portion, is also provided with an erasing portion for applying erasing energy to the sheet after readout of the image stored thereon is performed. The readout apparatus is configured so that the stimulable phosphor sheet is set therein and sent to the readout portion, wherein the image data as readout, and is then sent to the erasing portion, wherein the remaining radiation energy is dissipated, and after these continuous operations are complete, the sheet is discharged from the apparatus.

In this way, according to a general radiation image readout apparatus equipped with a readout portion and an erasing portion, after the image is readout from the stimulable phosphor sheet by the readout portion it is always sent to the erasing portion and subjected to erasing; however, because the erasing operation is performed by, for example, continuously exposing the sheet to erasing light for a only a certain period of time, the total time required for performing readout of the image (readout time) and the time required for erasing the remaining radiation energy (erasing time) is the operation time per sheet.

However, when used in conjunction with a group diagnosis, etc., in which radiation images for a large number of patients are readout, when it is necessary to perform readout of the images, from the stimulable phosphor sheets on which photographing has been completed, in a short time, because aforementioned readout and erasing operations are carried out in a continuous manner, a problem arises in that the operation time is excessively long.

On the other hand, there are radiation image readout apparatuses comprising only a readout portion, that is, that are provided with no erasing portion whatsoever. When such apparatuses are used, a method which is the opposite of the operation of the apparatus described above, that is, even for cases in which there is no shortage of time, because only readout is performed, without performing erasing, a sheet from which an image has been read out must be erased by a use of a specialized erasing apparatus, and handling of such an operation is cumbersome.

SUMMARY OF THE INVENTION

The present invention has been developed in consideration of the circumstances described above, and it is a primary objective of the present invention to provide a radiation readout apparatus for performing readout of a radiation image and erasing of remaining radiation in a manner corresponding to the needs of an operators circumstances: when there is a shortage of time, and when there is no shortage of time.

According to the first radiation readout apparatus according to the present invention, by making it possible to select whether or not erasing is to be performed after readout of a radiation image has been completed, readout and erasing operations can be performed in a continuous manner when there are no constraints on the overall operation time, and for cases in which there are constraints on the overall operation time, only the readout operation is given priority and the erasing operation is performed at another time so that the operation time can be shortened, and the apparatus is thereby capable of being employed in a manner suiting the needs of an operator.

That is to say, the first radiation apparatus according to the present invention comprises a readout portion for reading out the radiation image data cumulatively recorded thereon, and an erasing portion for erasing the remaining radiation energy remaining on the sheet after readout of the radiation image has been performed, and is also provided with a mode input means capable of selecting and inputting either the readout-and-erase mode, in which the remaining radiation erasing operation is performed after readout of the radiation image data, or the readout only mode, in which aforementioned erasing operation is not performed immediately after readout of the image data, and a mode control means for controlling at least the erasing portion with regard to whether the erasing operation is to be performed or not.

More specifically, the readout portion scans the stimulable phosphor sheet with a stimulating light, and photoelectrically reads out the quantity of stimulated emission emitted, corresponding to the radiation image data that has been cumulatively recorded on the stimulable phosphor sheet, and the erasing portion causes the radiation energy remaining on the sheet to be dissipated by apply erasing energy thereto. Note that the operation of applying erasing energy may consist of, for example, illuminating the stimulable phosphor sheet with a visible spectrum, etc. erasing light for a predetermined period of time.

In addition, with respect to the readout mode, the expression "erasing operation is not performed" refers not only to carrying out no erasing whatsoever, that is, where no erasing light is emitted, etc. and no erasing energy whatsoever is applied to the sheet, but includes, for example, cases in which, even though no erasing whatsoever is performed, the sheet must be conveyed through the erasing portion, and during only the minimal duration of the interval when the sheet is merely being conveyed through the erasing portion, the sheet is illuminated by erasing light and erasing, though insufficient erasing, is performed. That is to say, for cases in which the remaining radiation energy is erased from a stimulable phosphor sheet by the illumination thereof by erasing light, the erasing energy is prescribed by the product of the intensity and the duration of illumination, and in order to apply sufficient erasing energy to completely erase the radiation energy remaining on the stimulable phosphor sheet, it is necessary to convey the sheet through the erasing portion at a speed slower than that required for cases in which the sheet is simply passed through the erasing portion, so as to ensure for adequate illumination time for illumination of the sheet by the erasing energy; in this case, the throughput of the overall operation for the erasing operation is lowered. However, for cases in which the stimulable phosphor sheet is simply passed through the erasing portion, the throughput is not lowered, and although the incidental erasing light to which the sheet is exposed to during the interval in which it is passed through the erasing portion is not sufficient to completely erase the remaining radiation energy, erasing, though insufficient can be performed and the remaining radiation energy can be to a certain degree reduced, and there is a merit in that when the remaining radiation energy is erased afterwards by a separate operation, the time required therefor is shortened.

Regarding the erasing energy to be applied in the erasing operation of the erasing portion (meaning the operation performed in order to completely erase the remaining radiation energy), the level thereof required for erasing the remaining radiation energy can be calculated by obtaining, based on the electric signal obtained at the readout portion by photoelectrically reading out the stimulated emission emitted from the stimulable phosphor sheet, the quantity of remaining radiation, or alternatively, a separate erasing energy level detection means maybe provided for obtaining the level of erasing energy required for erasing the remaining radiation. Note that the level of erasing energy required can be selected corresponding to the level of the remaining radiation obtained, which is delineated in reference to, for example, 10 steps of levels which have been set in advance.

Input of the mode into the mode input means is performed by the operator of the radiation image readout apparatus.

The referent of the expression "do not perform the erasing operation" with regard to the mode control means includes, as described above, performing no erasing whatsoever, as well as performing insufficient erasing, wherein the range of throughput has not been lowered. In addition, the selection control by the mode control means, corresponding to the mode, more specifically, entails the implementation of controls causing the erasing operation to be performed by the erasing portion in a continuous manner after readout has been performed by the readout portion, in the readout-and-erase mode, and in the read-only mode, entails the implementation of controls causing the readout operation to be performed and the erasing operation not to be performed after the readout operation has been performed.

For cases in which the radiation image readout apparatus is an apparatus wherein until the completion of the performance of the readout operation by the readout portion and the subsequent erasing operation by the erasing portion on a stimulable phosphor sheet, which are performed in a continuous manner, operations on the next stimulable phosphor sheet are not commenced (the so-called single plate <sheet> reader), implementation of the present invention is particularly effective and advantageous. With this type of readout apparatus, although it is necessary that the stimulable phosphor sheet pass through the erasing portion, by selecting the readout-only mode, the sheet can be made to simply pass therethrough without performance of the erasing operation, and the effect whereby the operation time is shortened is great. Note that the expression "completion of the performance of the readout operation by the readout portion and the subsequent erasing operation by the erasing portion, which are performed in a continuous manner" refers to the passing through of the sheet through the readout portion, after which, by being passed through the erasing portion, the operation on one sheet is complete.

Note that it is favorable that it is possible to select and input at the mode selecting means the readout-and-erase mode or the readout-only mode for the operation to be performed on each stimulable phosphor sheet. This is because the operation to be performed on each sheet can be conveniently made to meet the needs of each different operator. In this case, it is also favorable that the mode control means performs selection control with respect to the operation(s) to be performed on each sheet, corresponding to the mode that has been input at the mode input means.

It is preferable that in addition to the readout-and-erase and the readout-only modes, the mode input means is capable of selecting an erase-only mode wherein the readout operation is not performed by the readout means and only the erasing operation is performed by the erasing portion, whereupon the operation is complete, and that the mode control means, corresponding to the mode input to the mode input means, also controls the selection of whether or not the readout portion is to perform the readout operation or not. For un-erased sheets, which have hitherto been subjected to processing wherein the readout-only mode was selected and the erasing operation was not performed, there is no need to perform readout, and because it is only necessary to perform the erasing operation thereon, by being configured in this way, the time required to pass through the readout portion can be shortened, with respect to un-erased sheets, and only the erasing operation (complete erasing of the remaining radiation) can be performed.

In this case, it is more favorable that a sheet-specific information input means, into which specific information for each sheet that is to be the subject of operations is input, as well as a recording means for recording, at least in the readout-only mode, on a predetermined storage medium the erasing energy level, correlated to the sheet-specific information entered into the sheet-specific information input means for each stimulable phosphor sheet that is to become the subject of a readout operation, required to erase the remaining radiation on said stimulable phosphor sheet, wherein the erasing portion, in the erase-only mode, based on the erasing energy level correlated to the sheet-specific information recorded on the predetermined storage medium for each stimulable phosphor sheet to become the subject of an erasing operation, performs the erasing operation thereon.

The second radiation readout apparatus according to the present invention performs the erasing operation after readout of the radiation image, in a non-continuous manner at a later time, and by making it possible to selectively perform only the erasing operation on sheets that have not been erased, the time required to perform the unnecessary readout operation omitted and the operation time shortened.

That is to say, the second radiation readout apparatus according to the present invention comprises a readout portion for reading out the radiation image data cumulatively recorded on a stimulable phosphor sheet, and an erasing portion for erasing the radiation energy remaining on a stimulable phosphor sheet after readout of the radiation image data contained thereon has been performed, and further comprises a mode input means for inputting a selectable erase-only mode in which the readout operation is not performed by the readout portion and only the erasing operation is performed by the erasing portion, whereupon the operation is complete, a mode control means for controlling selection of whether or not the readout portion and erasing portion are to perform or not perform each of the operations, and an erasing energy level detection means for detecting, at least in the erase-only mode, the erasing energy level required for erasing the radiation energy remaining on a stimulable phosphor sheet that is the object of an erasing operation, wherein said erasing portion performs aforementioned erasing operation, based on the erasing energy level detected by the erasing energy level detecting means.

Here, the selection control by the mode control means, corresponding to the mode, more specifically, for the erase-only mode, entails implementing controls so that the readout portion does not perform the readout operation and the erasing portion performs the erasing operation, and for modes other than the erase-only mode, entails implementing controls so that at least the readout operation is performed by the readout portion. Modes other than the erase-only mode can include: as in the operation of the radiation image readout apparatus described above, the readout-and-erase mode, which is controlled so that performance of the erasing operation by the erasing portion is performed in a continuous manner after readout of the radiation image data by the readout portion; the readout-only mode, which is controlled so that the readout portion performs the readout operation, but the erasing portion does not perform the erasing operation; or both of these modes, etc.

The erasing energy level detection means, more specifically, for example, performs an operation such as detecting the quantity of radiation energy remaining on a stimulable phosphor sheet by illuminating the sheet with a stimulating or visible spectrum of light, photoelectrically reading out the quantity of light emitted as a stimulated emission, corresponding to the quantity of radiation energy remaining on the sheet, and obtaining an electric signal thereof, and based on this electric signal, computes the level of erasing energy required to erase the radiation energy remaining on the sheet. Note that according to the second radiation image readout apparatus of the present invention, because it is possible to select the erase-only mode, in which the readout portion does not perform the readout operation, as in the first radiation image readout apparatus, a function of detecting the remaining radiation energy cannot be combined with the structures of the readout portion used for performing readout of a radiation image, and therefore, even when the readout portion does not perform the readout operation, detection of the remaining radiation energy can be performed independently and an independent erasing energy level detection means must be provided.

According to the first radiation image readout means of the present invention, the erasing operation is performed following the readout operation, and by making it possible to select whether it is performed or not, when there is no shortage of overall operation time, the readout and erasing operations are performed in a continuous manner as a consecutive series, and when there is not sufficient overall operation time, the erasing operation only is performed at a later time, and the readout time can be shortened or the conditions of an operator can be accommodated.

That is to say, after the sheet has been set in the readout apparatus it is passed through the readout portion, and in a readout apparatus in which passing the sheet through the erasing portion afterwards is unavoidable, when it is necessary to perform readout on a large number of sheets in a short time, by selecting the read-only mode, performance of the erasing operation on a large number of sheets is omitted and only the readout operation is performed on said sheets, whereby the operation time can be shortened by the amount of time that would have been required to perform the erasing operation on the sheets. Note that as for un-erased sheets, the erasing operation can be performed for the group of sheets at a later date when there is ample time therefor.

The radiation image readout apparatus according to the present invention is particularly effective when implemented in a single-sheet reader, in which a single sheet is set in the readout apparatus and passed through the readout portion, after which it is also passed through the erasing portion and then discharged from the readout apparatus, and the next sheet is loaded, in that an effect whereby a substantial shortening of operation time can be obtained.

According to the second radiation image readout apparatus of the present invention, the erasing operation, which was performed in a continuous manner following the readout operation in the first radiation image readout apparatus described above, is performed at a later time and in a non-continuous manner with the readout operation, and by making it possible that only the erasing operation be selectively performed on sheets that have not been erased, the time required to perform the readout operation, which is unnecessary for sheets that have already been readout is omitted and operation time shortened. That is to say, according to readout apparatuses whose operation is such that a sheet is set in the apparatus and passed through the readout portion and then must also be passed through the erasing portion, for cases in which only the erasing operation is to be performed, by selecting the erase-only mode, the readout operation, which consumes a comparatively large amount of time and electricity, is omitted and only the erasing operation is performed

DESCRIPTION OF THE PREFERRED EMBODIMENTS

Hereinafter, the preferred embodiments of the radiation image readout apparatus according to the present invention will be explained with reference to the drawings.

Figure 1:
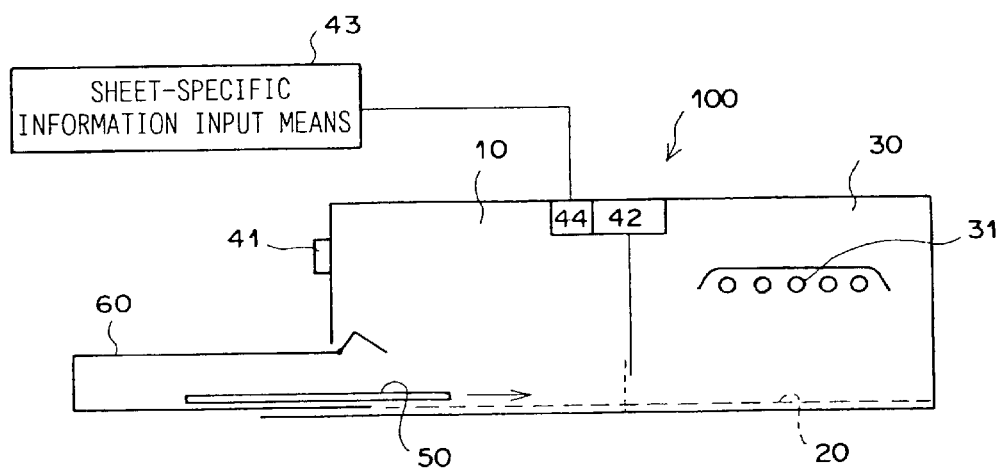
FIG. 1 is a schematic drawing of a radiation image readout apparatus according to the first embodiment of the present invention.

FIG. 1 shows the structures of a first embodiment of the first radiation image readout apparatus according to the present invention. The radiation image readout apparatus 100 shown in FIG. 1 comprises a readout portion 10 for reading out the radiation image data cumulatively recorded on a stimulable phosphor sheet 50, and an erasing portion 30 for erasing the radiation energy remaining on the stimulable phosphor sheet after the image data recorded thereon has been readout, further comprising a mode input switch 41 for selecting and inputting the desired mode from among three modes, including a readout-and-erase mode 1, in which the erasing operation is performed after the radiation image data has been readout by the readout portion, and the operation is thereby complete, a readout-only mode 2, in which the erasing operation is not performed after the readout has been performed, and the operation is thereby complete, and an erase-only mode 3, in which the readout operation is not performed by the readout portion and only the erasing operation is performed by the erasing portion, and the operation is thereby complete, a mode control switch 42 for controlling, according to mode 1, 2, or 3 input at the mode input switch, whether or not the readout portion and erasing portion perform each readout or erasing operation, a sheet-specific information input means 43 for inputting information C defined for each specified sheet, and a recording means 44 for recording on a predetermined storage medium the erasing energy level, correlated to the specific-sheet information C input for each sheet by sheet-specific information input means 43, required for erasing the radiation energy remaining on a stimulable phosphor sheet 50 that has been the subject of a reading out operation, in readout-only mode 2.

Figure 2:
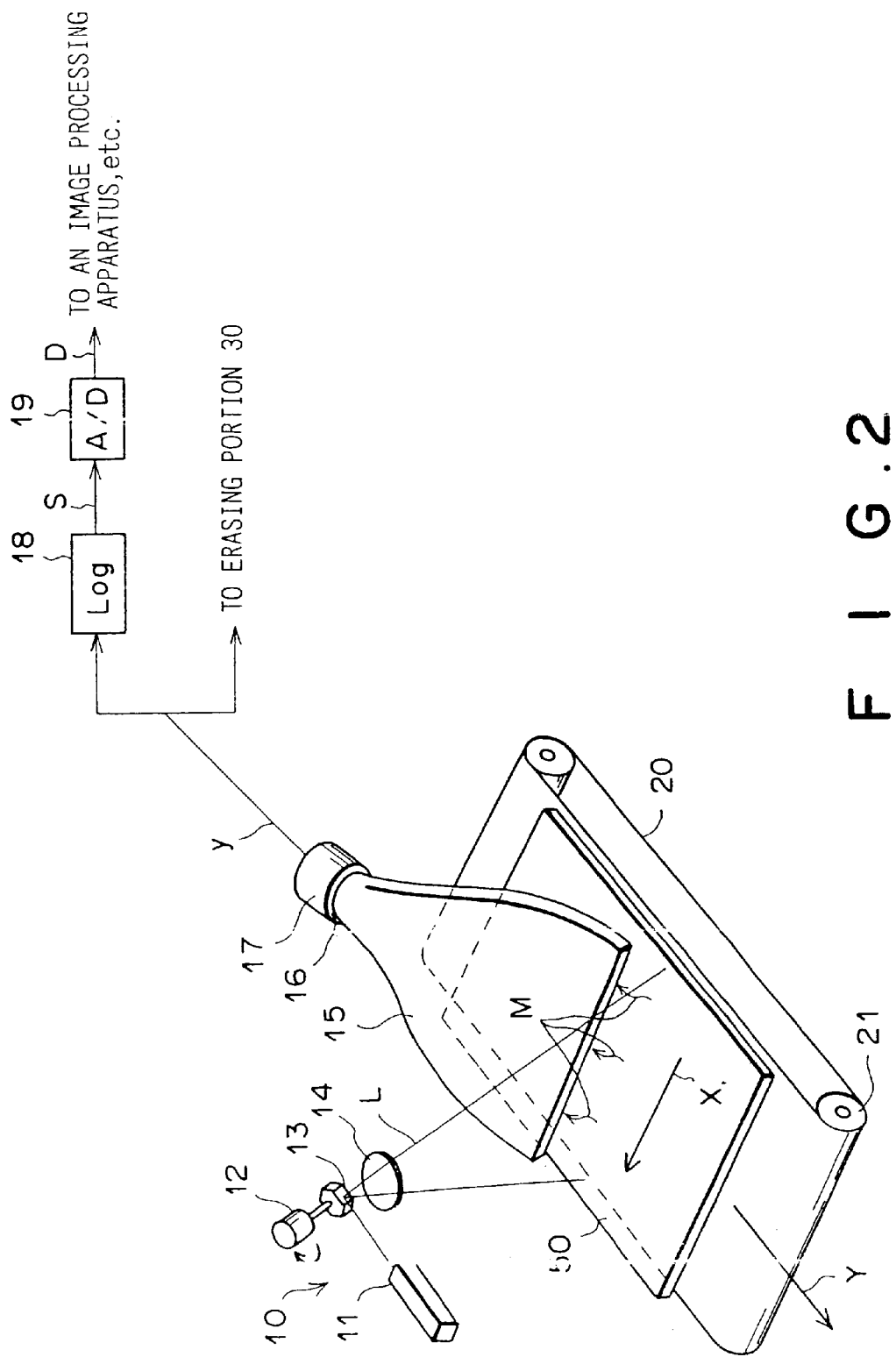
FIG. 2 is a detailed block drawing of the readout portion of the radiation image readout apparatus shown in FIG. 1.

Here, readout portion 10, more specifically, as shown in FIG. 2, a stimulable phosphor sheet 50 on which radiation image data has been cumulatively recorded is loaded onto and conveyed by an endless belt 20, which is driven by a rotating roller 20, in the direction indicated by arrow Y, and on the one hand, the laser light L emitted by a light source 11 as stimulating light is reflected and deflected by a rotating polygon mirror, which is driven by a motor 12 and rotated at a high speed in the direction indicated by arrow Y, focused by scanning lens 14 onto the surface of sheet 50 and scanned at an equivalent speed onto the surface of sheet 50, which is on endless belt 20, in the main scanning direction indicated by arrow X. By scanning of sheet 50 by laser light L in the main and sub scanning directions, the entire surface of changed sheet 50 is irradiated by laser light L.

The laser light L irradiating sheet 50 stimulates the stimulable phosphor layer thereof, and stimulated emission M, composed of a quantity of light corresponding to the radiation image data that has been cumulatively recorded on said layer, is emitted from the surface of sheet 50.

The stimulated emission M emitted from the surface of sheet 50 is guided by a focusing guide 15, which is disposed adjacent to the surface of sheet 50, through a laser-light cutoff filter 16 to the photomultiplier (PMT) 17, and photoelectrically detected by said photomultiplier 17. Focusing guide 15 is formed from an acrylic panel, etc. photoconductive material. A straight-line shaped input face is disposed extending along the main scanning direction on sheet 50, and the light-receiving face of photomultiplier 17 is coupled to a ring-shaped output face through laser-light cutoff filter 16. The stimulated emission M entering focusing guide 15 from the input face goes through repeated total reflections continually in the interior of focusing guide 15, output from the output face, passed through laser cutoff filter 16 and received at photomultiplier 17; the stimulated emission M, which represents the radiation image data, is converted to an analog image signal Y by photomultiplier 17.

One analog image signal Y output from photomultiplier 17 is input to logarithmic amplifier 18 as the basis of the image signal for reproduction as a visible image for diagnostic reading, and another image signal Y output therefrom is input to erasing portion 30 as the basis for computing the erasing energy level which will later be used for irradiating sheet 50 to erase the radiation energy remaining thereon.

The analog image signal Y input to logarithmic amplifier 18 is logarithmically amplified so as to have suitable visual characteristics and converted to a logarithmic signal S, converted to a digital signal D by an A/D conversion circuit 19 and output to an image processing apparatus, etc. An image processing apparatus, for example, first displays digital signal D on a display apparatus as a visible image, or prints out said digital signal D as a visible image to film by use of a laser printer, and then subjects the visible image that has been output to sharpness enhancement processing, frequency processing, gradation processing, etc. so that the image is easy to read and diagnose.

Erasing portion 30 is provided with a fluorescent lamp 31 whose light serves as erasing light, and irradiates sheet 50, which has been through the readout operation and while continuing to be on endless belt 20 has been transported from readout portion 10, with a quantity of fluorescent light from fluorescent lamp 31, which has been determined based upon the analog signal Y obtained by photomultiplier 17 of readout portion 10 and input to erasing portion 30.

Note that according to radiation image readout apparatus 100 of the first embodiment, the 1 sheet 50 held in cassette 60 is guided into readout portion 10 from cassette 60 (in the direction of the arrow), and after passing through the readout portion, sheet 50 is guided into the erasing portion, sent in the direction reverse to the arrow and again through readout portion 10 and put again into cassette 60, however, while the single sheet 50 is in the readout apparatus 100, another sheet cannot be introduced thereto; the apparatus is a so-called single sheet reader.

Mode input switch 41 provides the facility for selecting and inputting the operation mode, which determines which operations will be performed on a sheet 50 introduced into readout apparatus 100, desired by the operator. An operator selects the desired mode from among readout-and erase mode 1, in which the readout and erasing operations are performed, readout-only mode 2, in which only the erasing operation is not performed after the readout operation is performed, and erase-only mode 3, in which the readout operation is not performed and only the erasing operation is performed, and inputs the selected mode into mode input switch 41.

As an example, readout-and-erase mode 1 is selected when there is ample time, and the readout and erasing operations are performed in a continuous manner as a consecutive series, readout only mode 2 is selected when there is not ample time, and the erasing operation is not performed after the readout operation is performed, and erase-only mode 3 is selected for cases in which non-erased sheets, which have previously been subjected to the readout operation in readout-only mode 2 are to be subjected only to the erasing operation.

According to mode control means 42: for cases in which readout-and-erase mode 1 has been input to mode input switch 41, implements controls so that readout portion 10 performs the readout operation, and the sheet 50 that has been readout is caused to stay in erasing portion 30 for a predetermined length of time (longer than that required when the sheet is simply passed therethrough), during which sufficient erasing energy is applied to sheet 50 to completely erase the radiation energy remaining thereon; for cases in which readout-only mode 2 has been input, implements controls so that readout portion 10 performs the readout operation and sheet 50 is simply passed through erasing portion 30; and for cases in which eras-only mode 3 has been input, Implements controls so that sheet 50 is simply passed through readout portion 10 and caused to stay in erasing portion 30 for a predetermined length of time (longer than that required when the sheet is simply passed therethrough), during which sufficient erasing energy is applied to sheet 50 to completely erase the radiation energy remaining thereon.

Note that when readout-only mode 2 is the operational mode, recording means 44 correlates the erasing energy level computed by erasing portion 30, based on the electric signal Y input thereto from photomultiplier 17, with the sheet-specific information C input by sheet-specific information input means 43 for the sheet 50, and records the computed erasing energy level and sheet-specific information C of sheet 50 on a predetermined recording medium. On the other hand, when erase-only mode 3 is the operational mode, based on the sheet-specific information C input by sheet-specific information input means 43 for the sheet 50, erasing portion 30 implements controls so that recording means 44 reads out the erasing energy level correlated to said sheet-specific information C from the predetermined storage medium, and erasing portion 30 also erases the remaining radiation on sheet 50 by use of erasing energy of the level readout from the predetermined storage medium by recording means 44.

Input of sheet-specific information C to sheet-specific information input means 43 can entail the direct input by the operator via a keyboard or bar code reader (neither of which are shown) of the sheet ID number attached to the sheet 50, and the ID number of 1 cassette with which the sheet 50 has been correlated, or when a cassette 60 is set in readout apparatus 100 for operation, the information can be input automatically by a bar-code reader (not shown) with which readout portion 10 has been provided.

Figure 3:
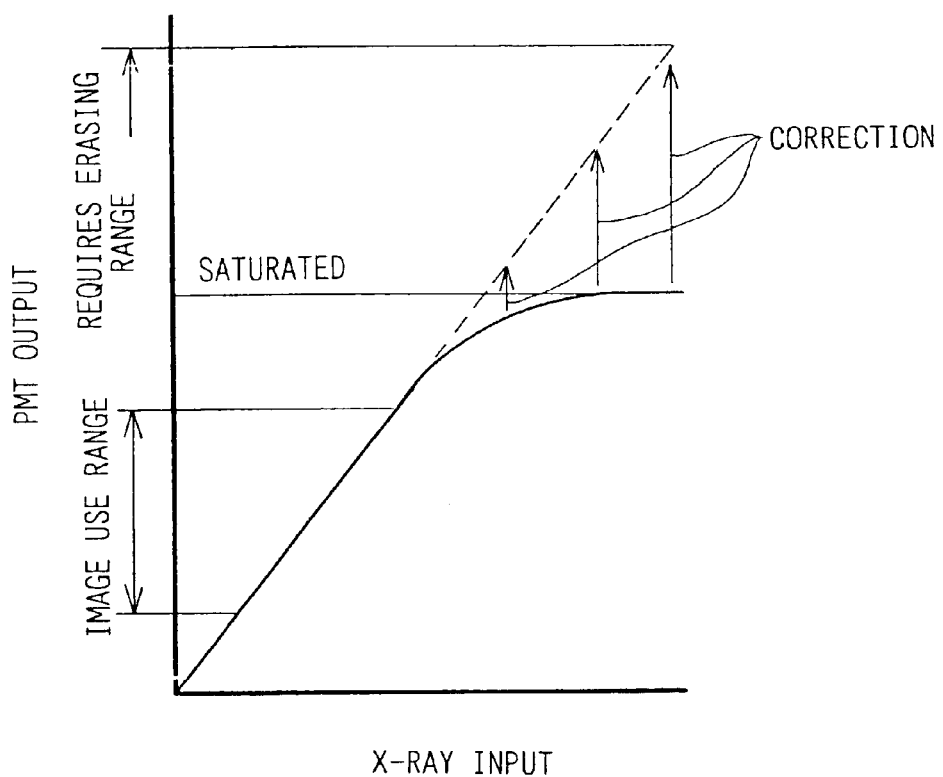
FIG. 3 is a schematic drawing of the characteristics of the input and output of a PMT (Photomultiplier)

Note that because the linearity of the quantity of radiation irradiating the stimulable phosphor particles forming sheet 50 and the quantity of light of the stimulated emission emitted therefrom are maintained over a wide exposure area, in principle, based on the detected electric signal Y, the quantity of radiation irradiated onto sheet 50 can be derived, and it is possible to compute the radiation energy remaining after readout has been performed. However, as shown in FIG. 3, in as the output of PMT 17 (electric signal Y) is saturated in the high-volume range of the stimulated emission, the remaining energy calculated based simply on the output of PMT 17 (electric signal Y), results in a lower estimate than the actual quantity of remaining radiation energy (by computing the quantity of radiation on the portion of pixels not bearing the image, a number between 100 mR–1000 mR). As a result, the erasing energy is insufficient to completely erase the remaining radiation energy, and a state in which noise remains occurs. Therefore, it is preferable to correct the output of PMT 17, corresponding to the high-volume light range of stimulated emission M so that linear correspondence is attained between input and output of PMT 17, utilizing a compensation table, etc., as the dotted line shown in FIG. 3.

Note that it is acceptable that this linear compensation be performed only on the electric signal Y output from PMT 17 to the erasing section; it is not necessarily required that the linear compensation be performed on the electric signal Y output to the logarithmic amplifier 18. For a radiation image of a normal subject, the range of the output of PMT 17 used as an image is the "image use range" band (by computing the quantity of radiation, a number between 100 mR–1000 mR), shown in the same diagram; this is because this band maintains the characteristics of the input and output of PMT 17 substantially completely linear.

According to the radiation image readout apparatus 100 of the current embodiment configured in this way, when there is ample overall operation time, by input of readout-and-erase mode 1 to mode input circuit 41 by the operator, a sheet 50 that has been set in readout apparatus 100, under the control of mode control means 42, is readout by readout portion 10, after which the sheet 50 is conveyed to erasing portion 30 wherein it is kept for a sufficient period of time to be completely erased, and is again passed through the readout portion and placed in cassette 60, whereupon the operation is complete. In this way, when there is ample operation time, by taking the time to perform both the readout and erasing operations, because the readout and erasing operations can be completed in a single operation cycle, operational simplicity and convenience can be obtained.

On the other hand, when there is not ample operation time, for cases in which it is necessary to readout a large number of sheets 50 in a short time, by input of readout-only mode 2 to mode input circuit 41 by the operator, a sheet 50 set in readout apparatus 100, under control of mode control means 42, is readout by readout portion 10, after completion of which said sheet 50 is simply passed through erasing portion 30, and is again passed through readout portion 10 and placed in cassette 60, whereupon the operation is complete. While the readout-only mode operational mode is being carried out, the sheet-specific information C for said sheet 50 is input to sheet-specific information input means 43, the erasing energy level is computed by erasing portion 30, based on the electric signal Y obtained by readout portion 10, and recording means 44 correlates the sheet-specific information C with said computed erasing energy level and records them on a predetermined storage medium. For cases like this when there is not ample operation time, by omission of performance of the erasing operation the time it takes for sheet 50 to be passed through erasing portion 30 can be shortened and priority placed on the readout operation, and if required, the erasing operation can be performed separately later, when there is ample time. Note that when readout-only mode 2 is the operational mode, although radiation image readout apparatus 100 of the current embodiment does not perform the erasing operation, because the erasing energy level for each sheet 50 is computed and correlated with sheet (the sheet-specific information C thereof) and recorded, when only the erasing operation performed at a later point in time, because the recorded erasing energy level is readout and used, it is not necessary to redetect or recomputed the erasing energy level, and accordingly, the wasteful operation wherein the readout portion is operated solely for the purpose of erasing energy level is eliminated.

That is to say, by having selected and inputted readout-only mode 2, for cases in which the erasing operation is to be performed on sheets 50 on which the readout operation has been completed, but that are un-erased, by input of erase-only mode 3 to mode input switch 41 by the operator, a sheet 50 that has been set in readout apparatus 100 is simply passed through readout portion 10 and guided into erasing portion 30, under the control of mode control means 42. While this is in progress, the sheet-specific information C of said sheet 50 is input to sheet-specific information input means 43, and recording means 44, under the control of mode control means 42, reads out the erasing energy level correlated to said sheet-specific information C and inputs said erasing energy level to erasing portion 30. Erasing portion 30 performs the erasing operation, based on the erasing energy level input thereto, on said sheet 50 and completely erases the remaining radiation energy therefrom, after which said sheet 50 is passed through readout portion 10 and placed in cassette 60, whereby the operation is complete. By making it possible to selectively perform only the erasing operation on such un-erased sheets, the time required for performing an unnecessary readout operation is eliminated and the operation time is shortened, and requiring operation of the readout portion solely for computing the erasing energy level can be prevented.

Note that according to the radiation image readout apparatus of the first embodiment, a configuration in which operational mode 3 is omitted from mode input circuit 41 and mode control means 42 can be adopted. This is due to the fact that it is possible to use a separate means, that is, a method not employing the radiation image readout apparatus of the first embodiment, to perform only the erasing operation. In this case, a configuration in which the sheet-specific information input means 43 and the recording means 44 have been omitted is also possible. This is due to the fact that if the erasing operation only is not selectively performed, the structural components necessary to perform the erasing operation at a separate time from the readout operation are not required to be provided.

Figure 4:
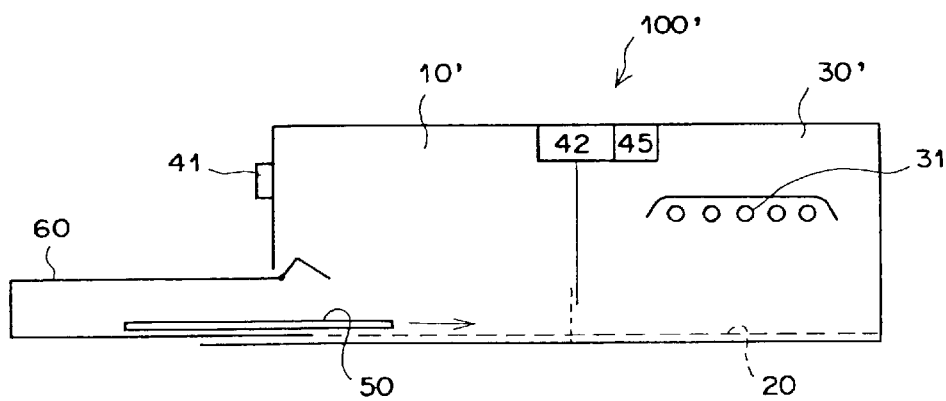
FIG. 4 is a schematic drawing of a radiation image readout apparatus according to the second or first embodiment of the present invention.

FIG. 4 is a schematic drawing of the configuration of a radiation image readout apparatus according to the second embodiment of the present invention. Compared to radiation image readout apparatus 100 shown in FIG. 1, the radiation image readout means 100' shown in FIG. 4 is of a configuration in which the sheet-specific information input means 43 and the recording means 44 have been omitted, and readout portion 10' does not output electric signal Y, which served as the basis for computing the erasing energy level, and is instead provided with a separate erasing energy detection means 45, and aside from the difference in that erasing portion 30' applies erasing energy to sheet 50 at the level detected by erasing energy level detection means 45, other structures and functions are the same as those of the first embodiment.

That is to say, when the erasing operation is performed by the erasing portion, regardless of whether the readout operation is performed (readout-and-erase mode 1) by readout portion 10' or not (erase-only mode 3), the erasing energy level is always detected by erasing energy level detection means 45. Accordingly, for cases in which mode 3 has been selected, because the erasing energy level can be detected by erasing energy level detection means 45, the is no need for readout portion 10' to be operated, and there is also no need to compute and record in advance on a storage medium, in the case of mode 2, the computed erasing energy level, etc. Therefore, according to the radiation image readout apparatus of the second embodiment, a configuration wherein the readout-only mode 2 is omitted can be adopted.

Note that other operations of the radiation image readout apparatus 100' of the current embodiment are the same as those of the radiation image readout apparatus 100 of the first embodiment, and therefore, explanation thereof has been omitted.

In addition, the radiation image readout apparatus 100' of the current embodiment can adopt the basic configuration of the radiation image readout apparatus 100 of the first embodiment.

What is claimed is:

1. A radiation image readout apparatus comprising a readout portion for reading out the radiation image data cumulatively recorded on a stimulable phosphor sheet, and an erasing portion for erasing the radiation energy remaining on said stimulable phosphor sheet after the radiation image data has been readout therefrom, further comprising:

a mode input means for inputting an operational mode, of which it is possible to select from between a readout-and-erase mode, in which after readout of the radiation image data is performed said erasing portion performs the erasing operation, and the operation is complete, and a mode control means for controlling, at least with respect to said erasing portion, the selection of whether or not the erasing operation is to be performed, corresponding to the mode which has been input at the mode input means.

2. A radiation image readout apparatus as defined in claim 1, wherein the readout portion and the erasing portion perform the readout and erasing operations, respectively, in a continuous manner as a consecutive series on 1 stimulable phosphor sheet, and until said operations are complete, operations on the next stimulable phosphor sheet cannot be commenced.

3. A radiation image readout apparatus as defined in claim 1 or 2, wherein said mode input means is capable of selecting and inputting said readout-and-erase mode or said readout-only mode for each readout operation performed on each stimulable phosphor sheet.

4. A radiation image readout apparatus as defined in claim 1 or 2, wherein said mode input means is also capable of selecting and inputting, in addition to said readout-and-erase mode and said readout-only mode, an erase-only mode wherein the readout operation is not performed by the readout portion and only the erasing operation is performed by the erasing portion, and the operation is complete, and said mode control means controls the selection of whether or not the readout portion is to perform the readout operation, corresponding to the mode which has been input at the mode input means.

5. A radiation image readout apparatus as defined in claim 3, wherein said mode input means is also capable of selecting and inputting, in addition to said readout-and-erase mode and said readout-only mode, an erase-only mode wherein the readout operation is not performed by the readout portion and only the erasing operation is performed by the erasing portion, and the operation is complete, and said mode control means controls the selection of whether or not the readout portion is to perform the readout operation, corresponding to the mode which has been input at the mode input means.

6. A radiation image readout apparatus as defined in claim 4, further comprising a sheet-specific information input means for inputting sheet-specific information for each stimulable phosphor sheet to be subjected to any of said operations, and a recording means for correlating, at least when said readout-only mode is the operational mode, the erasing energy level required for erasing the radiation energy remaining on a stimulable phosphor sheet that has been the object of said readout operation to said sheet-specific information input by the sheet-specific input means for said stimulable phosphor sheet, and recording said correlated erasing energy level and sheet-specific information on a predetermined storage medium, wherein when said erase-only mode is the operational mode, said erasing portion, based on the erasing energy level correlated to the sheet-specific information of the stimulable phosphor sheet to be subjected to the erasing operation and recorded on said storage medium, performs the erasing operation on said stimulable phosphor sheet.

7. A radiation image readout apparatus as defined in claim 5, further comprising a sheet-specific information input means for inputting sheet-specific information for each stimulable phosphor sheet to be subjected to any of said operations, and a recording means for correlating, at least when said readout-only mode is the operational mode, the erasing energy level required for erasing the radiation energy remaining on a stimulable phosphor sheet that has been the object of said readout operation to said sheet-specific information input by the sheet-specific input means for said stimulable phosphor sheet, and recording said correlated erasing energy level and sheet-specific information on a predetermined storage medium, wherein when said erase-only mode is the operational mode, said erasing portion, based on the erasing energy level correlated to the sheet-specific information of the stimulable phosphor sheet to be subjected to the erasing operation and recorded on said storage medium, performs the erasing operation on said stimulable phosphor sheet.

8. A radiation image readout apparatus comprising a readout portion for reading out the radiation image data cumulatively recorded on a stimulable phosphor sheet, and an erasing portion for erasing the radiation energy remaining on said stimulable phosphor sheet after the radiation image data has been readout therefrom, further comprising a mode input means capable of selecting and inputting an erase-only mode wherein the readout operation is not performed by the readout portion and only the erasing operation is performed by the erasing portion, and the operation is complete, and a mode control means for controlling, based on the mode input at the mode input means, the selection of whether or not the readout portion and the erasing portion are to perform each of said operations or not, and an erasing energy level detection means for detecting, at least when said erase-only mode is the operational mode, the erasing energy level required to erase the radiation energy remaining on a stimulable phosphor sheet that is to become the object of the erasing operation, wherein, based on the erasing energy level detected by said erasing energy level detecting means, said erasing portion performs the erasing operation on said stimulable phosphor sheet.

9. A radiation image readout apparatus comprising a readout portion for reading out the radiation image data cumulatively recorded on a stimulable phosphor sheet, and an erasing portion for erasing the radiation energy remaining on said stimulable phosphor sheet after the radiation image data has been readout therefrom, further comprising:

a mode input means capable of selecting and inputting an erase-only mode wherein the readout operation is not performed by the readout portion and only the erasing operation is performed by the erasing portion, and the operation is complete, and a mode control means for controlling, based on the mode input at the mode input means, the selection of whether or not the readout portion and the erasing portion are to perform each of said operations or not.

* * * * *